US012748330B2

(12) United States Patent
Lim et al.

(10) Patent No.: US 12,748,330 B2
(45) Date of Patent: Sep. 29, 2026

(54) DISPLAY DEVICE

(71) Applicant: LG DISPLAY CO., LTD., Seoul (KR)

(72) Inventors: Hwachun Lim, Bucheon-si (KR); Kyujin Lee, Gongju-si (KR); Gunwoo Lee, Changwon-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/794,412

(22) Filed: Aug. 5, 2024

(65) Prior Publication Data

US 2025/0155753 A1 May 15, 2025

(30) Foreign Application Priority Data

Nov. 15, 2023 (KR) ........................ 10-2023-0158281

(51) Int. Cl.
*G02F 1/1343* (2006.01)
*G02F 1/1335* (2006.01)
*G02F 1/1339* (2006.01)

(52) U.S. Cl.
CPC .. *G02F 1/134309* (2013.01); *G02F 1/133512* (2013.01); *G02F 1/13394* (2013.01)

(58) Field of Classification Search
CPC ......... G02F 1/134309; G02F 1/133512; G02F 1/13394
See application file for complete search history.

(56) References Cited

U.S. PATENT DOCUMENTS 5,095,379 A * 3/1992 Fukunaga ......... G02F 1/133516 430/143
2018/0052350 A1* 2/2018 Zhao ..................... G06F 3/0412
2019/0204638 A1* 7/2019 Park ....................... G02F 1/1333
2021/0141264 A1* 5/2021 Shin .................. G02F 1/133345

FOREIGN PATENT DOCUMENTS

JP 2014-010211 A 1/2014
KR 10-2006-0065392 A 6/2006
KR 10-2012-0017755 A 2/2012
KR 20160046328 A * 4/2016 ....... G02F 1/136286
KR 10-2023-0018894 A 2/2023
WO WO-2019240136 A1 * 12/2019 ............... G09F 9/30

OTHER PUBLICATIONS

Espacenet english translation of KR2016046328A (Year: 2016).*
Espacenet english translation of WO2019240136A (Year: 2019).*
Extended European Search Report in European Appln. No. 24191330.0, mailed on Jan. 15, 2025, 6 pages.

* cited by examiner

*Primary Examiner* — David Y Chung
(74) *Attorney, Agent, or Firm* — Fish & Richardson P.C.

(57) ABSTRACT

A display device according to an aspect of the present disclosure may include a first substrate including a display area and a non-display area, a second substrate attached to the first substrate in a state in which a first sealant is disposed, a first liquid crystal layer disposed inside the first sealant, a second sealant disposed outside the first sealant, a second liquid crystal layer disposed between the first sealant and the second sealant, a first electrode disposed on the first substrate in the non-display area, and a second electrode disposed on the second substrate in the non-display area and configured to define a capacitance together with the first electrode, thereby measuring and monitoring a cell gap in a bezel area.

26 Claims, 8 Drawing Sheets

DISPLAY DEVICE

CROSS-REFERENCE TO RELATED APPLICATIONS

This application claims the priority of Korean Patent Application No. 10-2023-0158281 filed on Nov. 15, 2023, in the Korean Intellectual Property Office, the disclosure of which is incorporated herein by reference.

TECHNICAL FIELD

The present disclosure relates to a display device, and more particularly, to a display device capable of measuring a cell gap in a bezel area.

BACKGROUND

Recently, with the increase in interest in information displays and the increasing demand for portable information media, research and commercialization have been focused on lightweight, thin-film flat panel displays (FPD). Among the flat panel displays, a liquid crystal display (LCD) displays images by using optical anisotropy of liquid crystals.

The liquid crystal display broadly includes a color filter substrate, an array substrate, and a liquid crystal layer formed between the color filter substrate and the array substrate.

SUMMARY

An object to be achieved by the present disclosure is to provide a display device capable of measuring and monitoring a cell gap in a bezel area by sensing a capacitance.

Objects of the present disclosure are not limited to the above-mentioned objects, and other objects, which are not mentioned above, may be clearly understood by those skilled in the art from the following descriptions.

A display device according to an aspect of the present disclosure may include a first substrate including a display area and a non-display area; a first liquid crystal layer disposed on the display area and the non-display area of the first substrate; a first sealant bordering the first liquid crystal layer; a second liquid crystal layer bordering the first sealant; a second sealant bordering the second liquid crystal layer; and a capacitor formed based on a first electrode and a second electrode at opposite ends of the second liquid crystal layer for detecting stress applied to the display panel.

According to an aspect of the present disclosure, a display device is disclosed. The display device includes a first substrate including a display area and a non-display area; a second substrate attached to the first substrate including a first sealant; a first liquid crystal layer disposed inside a region formed by the first sealant; a second sealant disposed outside a region formed by the first sealant; a second liquid crystal layer disposed between the first sealant and the second sealant; a first electrode disposed on the first substrate in the non-display area; and a second electrode disposed on the second substrate in the non-display area and forming a capacitance with the first electrode.

Other detailed matters of the exemplary embodiments are included in the detailed description and the drawings.

According to the present disclosure, the sealants are formed in the bezel area of the display panel, and the capacitance sensing structure implemented by the upper and lower electrodes is formed in the sealants, such that the cell gap in the bezel area may be measured and monitored. As a result, it is possible to electrically monitor, in real time, the change in capacitance during the module assembly process and immediately address any detected defect. In addition, it is possible to improve reliability by suppressing an image defect, such as a yellow mura or a bright spot, caused by an external force applied to a display panel.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
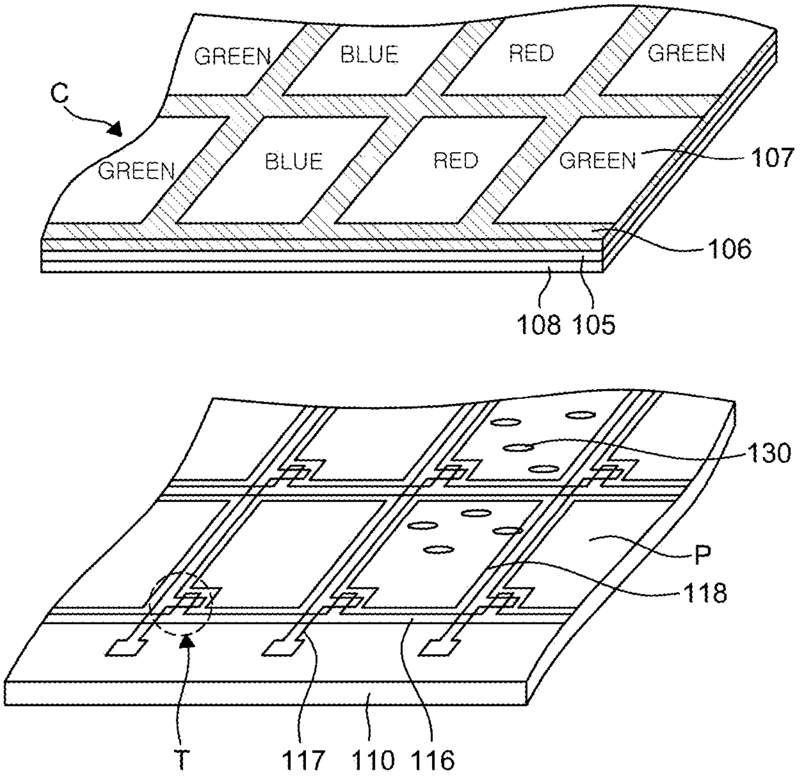
FIG. 1 is an exploded perspective view schematically illustrating a liquid crystal display device.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art may fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure may be partially or entirely adhered to or combined with each other and may be interlocked and operated in technically various ways, and the embodiments may be carried out independently of or in association with each other.

Hereinafter, an exemplary aspect of the present disclosure will be described in detail with reference to the drawings.

FIG. 1 is an exploded perspective view schematically illustrating a liquid crystal display device.

With reference to FIG. 1, the liquid crystal display device may include a color filter substrate 105, an array substrate 110, and a liquid crystal layer 130 formed between the color filter substrate 105 and the array substrate 110.

The color filter substrate 105 may include a color filter C including a plurality of sub-color filters 107 configured to implement red (R), green (G), and blue (B) colors, a black matrix 106 configured to separate the sub-color filters 107 and block light passing through the liquid crystal layer 130, and a common electrode 108 configured to apply voltages to the liquid crystal layer 130.

The array substrate 110 may include a plurality of gate lines 116 and a plurality of data lines 117 arranged in longitudinal and transverse directions and configured to define a plurality of sub-pixels P, thin-film transistors (TFTs) T formed in intersection areas between the gate lines 116 and the data lines 117, and pixel electrodes 118 formed on the sub-pixels P.

The color filter substrate 105 and the array substrate 110, which are configured as described above, are attached to be opposite to each other by a sealant (not illustrated) that is formed at an outer periphery of an image display area to form a display panel. The color filter substrate 105 and the array substrate 110 may be attached by alignment keys (not illustrated) that are formed on the color filter substrate 105 or the array substrate 110.

Meanwhile, for convenience of description, an example will be described in which a twisted nematic (TN) method of operating nematic liquid crystal molecules in a direction perpendicular to the substrate is used as a method of operating the liquid crystal display device. However, the present disclosure is not limited thereto. The present disclosure may be applied to an in-plane switching (IPS) type liquid crystal display device that increases a viewing angle to 170 degrees or more by operating liquid crystal molecules in a direction parallel to the substrate.

Figure 2:
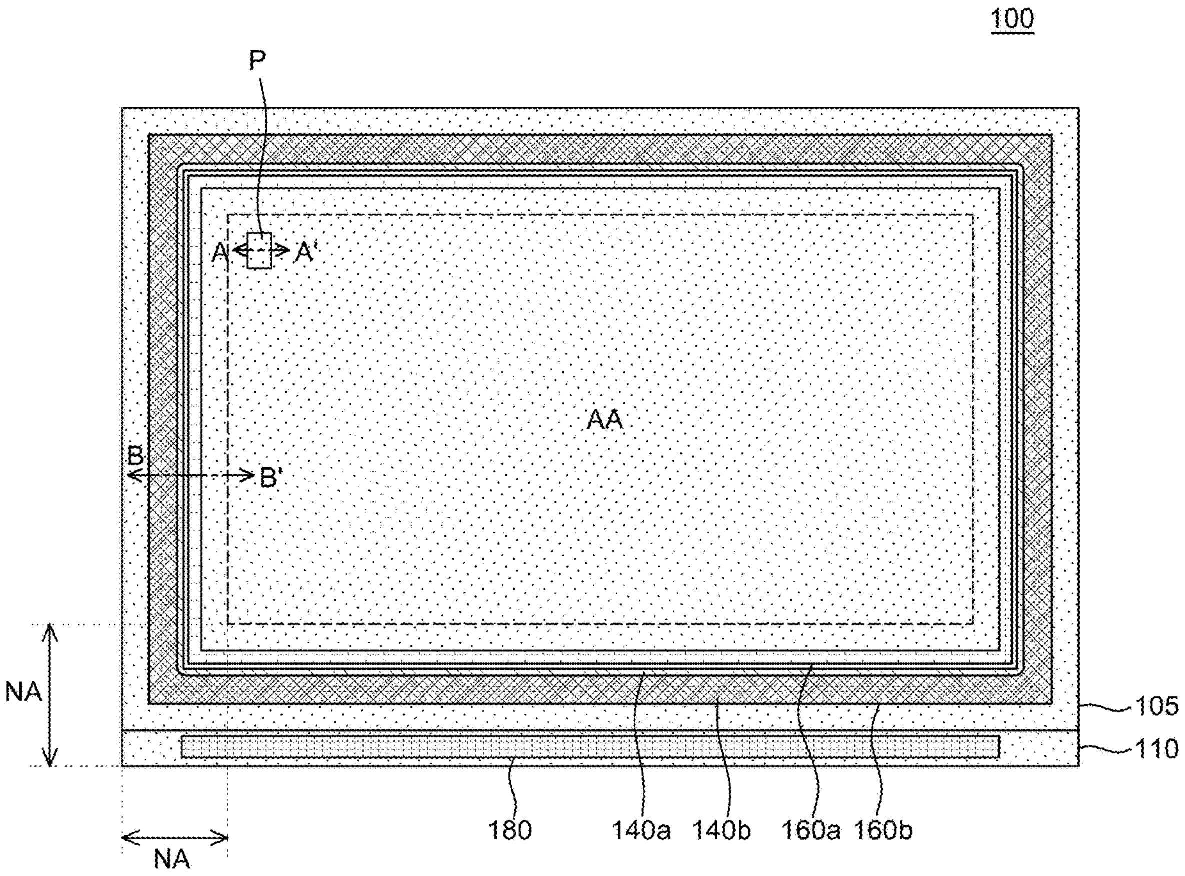
FIG. 2 is a top plan view schematically illustrating a display panel according to an aspect of the present disclosure.

FIG. 2 is a top plan view schematically illustrating a display panel according to an aspect of the present disclosure.

Figure 3:
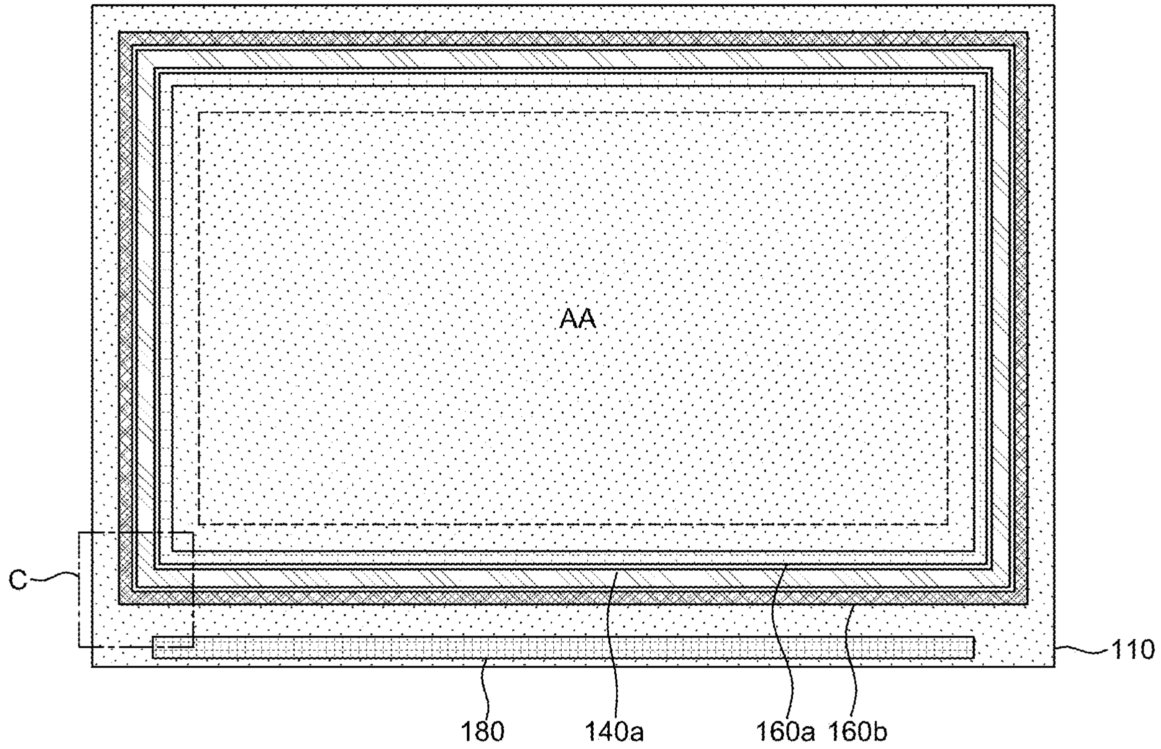
FIG. 3 is a view illustrating an array substrate of the display panel in FIG. 2.

FIG. 3 is a view illustrating an array substrate of the display panel in FIG. 2.

Figure 4:
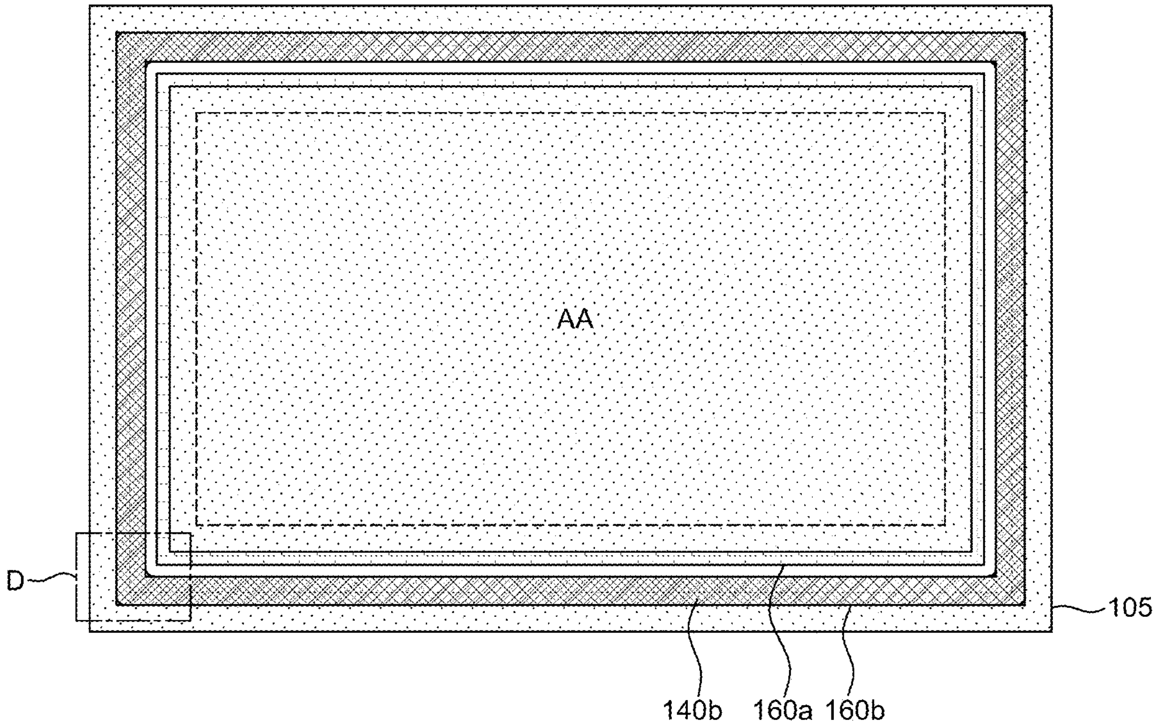
FIG. 4 is a view illustrating a color filter substrate of the display panel in FIG. 2.

FIG. 4 is a view illustrating a color filter substrate of the display panel in FIG. 2.

Figure 5:
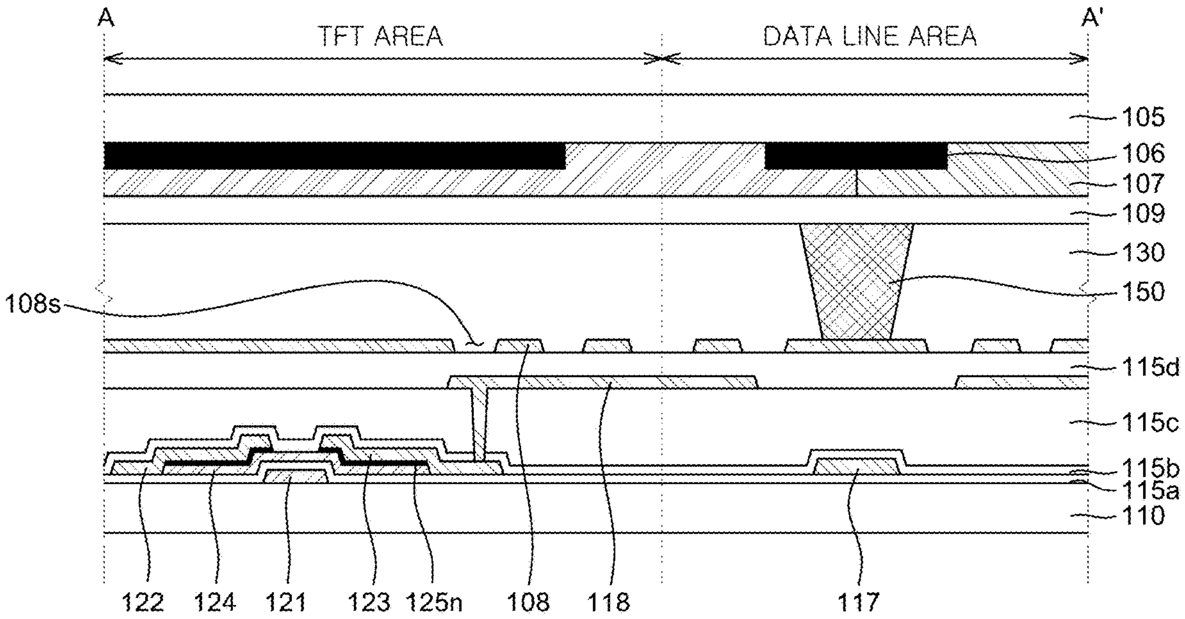
FIG. 5 is a view illustrating a cross-section taken along line A-A' in FIG. 2.

FIG. 5 is a view illustrating a cross-section taken along line A-A' in FIG. 2.

Figure 6:
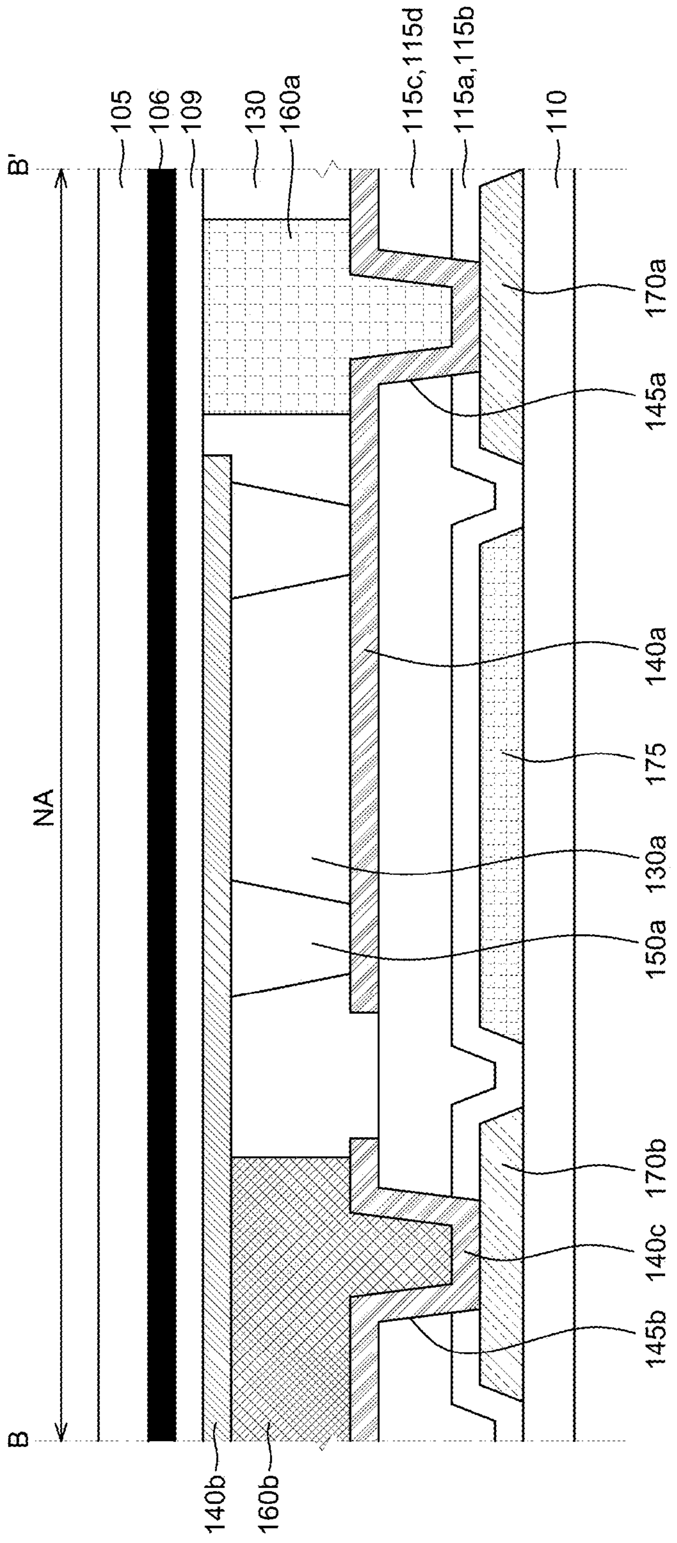
FIG. 6 is a view illustrating a cross-section taken along line B-B' in FIG. 2.

FIG. 6 is a view illustrating a cross-section taken along line B-B' in FIG. 2.

Figure 7:
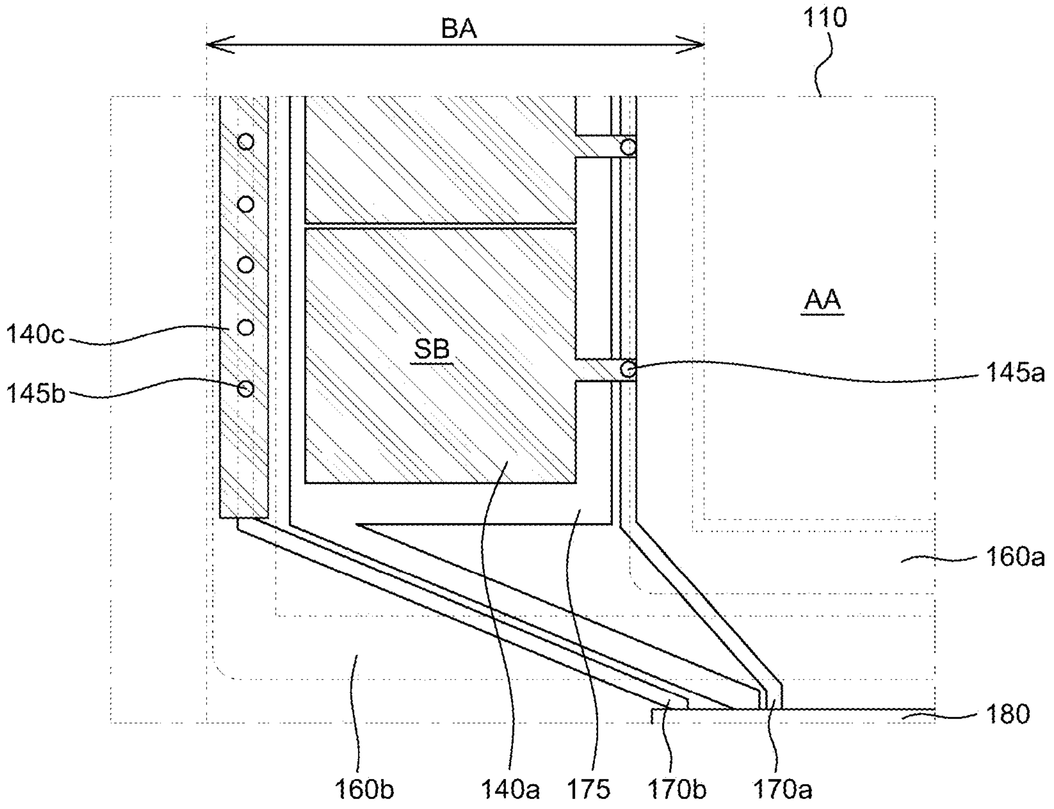
FIG. 7 is an enlarged view of part C in FIG. 3.

FIG. 7 is an enlarged view of part C in FIG. 3.

Figure 8:
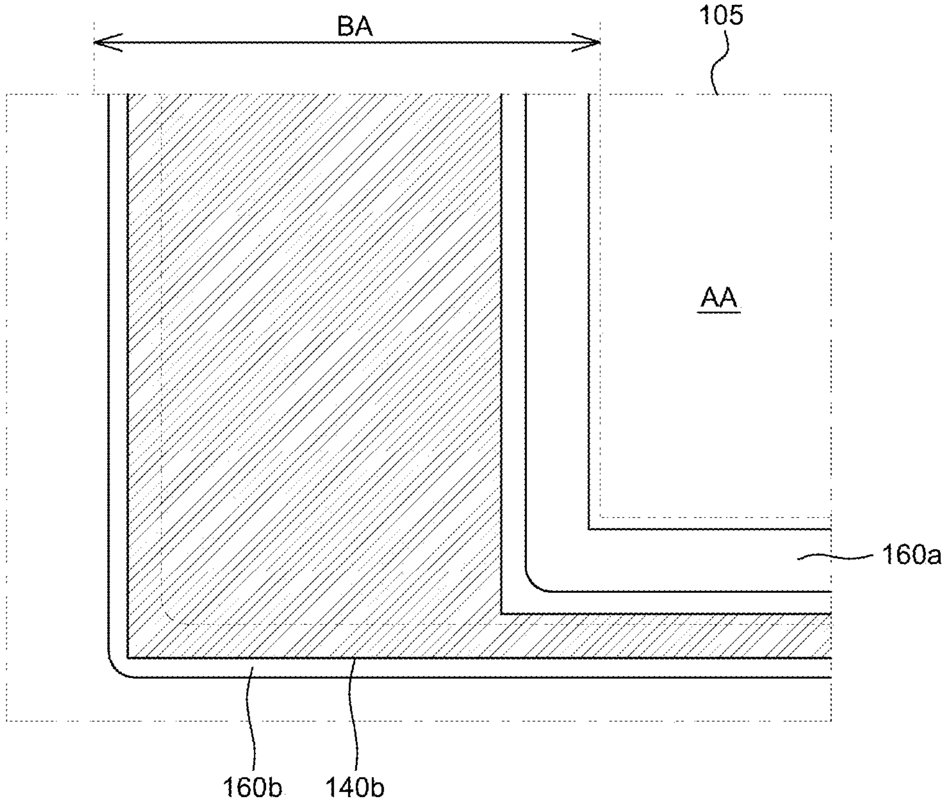
FIG. 8 is an enlarged view of part D in FIG. 4.

FIG. 8 is an enlarged view of part D in FIG. 4.

An example will be described in which the display device in FIGS. 2 to 8 is a liquid crystal display device. However, the present disclosure is not limited thereto. In addition, the in-plane switching (IPS) method will be described as an example of the method of operating the liquid crystal display device. However, the present disclosure is not limited thereto.

FIGS. 2, 3, and 4 are top plan views illustrating the display panel, the array substrate, and the color filter substrate according to the aspect of the present disclosure and schematically illustrating only main components of the present disclosure, for convenience of description.

FIG. 5 is a cross-sectional view illustrating a part of an in-plane switching type liquid crystal display device and a cross-sectional structure of a fringe field switching (FFS) type display panel. In an FFS type display panel, a fringe field is formed between a pixel electrode and a common electrode and penetrates a slit and operates liquid crystal molecules positioned above a pixel area and the common electrode, thereby implementing images. However, the present disclosure is not limited to the fringe field switching type.

In the fringe field switching type liquid crystal display device, the pixel electrode is formed at a lower side, and the common electrode is formed at an upper side when the liquid crystal molecules are oriented horizontally, such that an electric field may be generated in the horizontal and vertical directions, and the liquid crystal molecules operate while being twisted and tilted.

In addition, FIG. 5 illustrates a TFT area and a data line area of a display area of the display panel.

FIG. 6 is a cross-sectional view illustrating a part of a non-display area NA that is provided at an outer peripheral portion of the display area of the display panel.

In addition, FIGS. 7 and 8 are enlarged top plan views illustrating a part of the array substrate and a part of the color filter substrate according to the aspect of the present disclosure and schematically illustrating the main components of the present disclosure, for convenience of description.

With reference to FIGS. 2 to 4, a display panel 100 according to the aspect of the present disclosure may include the color filter substrate 105 (e.g., a first substrate), the array substrate 110 (e.g., a second substrate), and the liquid crystal layer 130 formed between the color filter substrate 105 and the array substrate 110. A first spacer 150 may be formed between the color filter substrate 105 and the array substrate 110 and to maintain a cell gap between the color filter substrate 105 and the array substrate 110.

In this case, the liquid crystal layer 130 may be referred to as a first liquid crystal layer to be distinguished from a second liquid crystal layer 130*a* to be described below.

The color filter substrate 105 and the array substrate 110 may include a display area AA and a non-display area NA, and a periphery of the display area AA may be defined as the non-display area NA. For example, the array substrate 110 has a shape in which the non-display area NA extends to the outside of the color filter substrate 105. A drive circuit 180 is connected to a gate pad and a data pad to transmit signals and may be disposed in the extended non-display area NA.

A connector, which is fitted with a connector of a terminal line connected to a printed circuit board and transmits signals to the drive circuit 180, may be disposed in the extended non-display area NA.

The color filter, which includes the red, green, and blue sub-color filters 107, may be disposed above the color filter substrate 105. The black matrix 106, which separates the sub-color filters 107 and blocks light passing through the liquid crystal layer 130, may be disposed above the color filter substrate 105. An overcoat layer 109, which planarizes an upper portion of the color filter and an upper portion of the black matrix 106, may be disposed above the color filter substrate 105.

The gate lines (not illustrated) and the data lines 117, which are disposed in the longitudinal and transverse directions and define the pixel area P, may be disposed on the array substrate 110. The thin-film transistor, which are switching elements, may be disposed in the intersection areas (e.g., TFT areas) between the gate lines and the data lines 117.

The color filter substrate 105 and the array substrate 110 are attached by a first sealant 160*a* in the color filter substrate 105 and the array substrate 110. The first sealant 160*a* may join the color filter substrate 105 and the array substrate 110 and assist the first spacer 150, which is disposed in the display panel 100, in maintaining the cell gap between the color filter substrate 105 and the array substrate 110.

In addition, the first sealant 160*a* may retain a liquid crystal injected between the color filter substrate 105 and the array substrate 110.

For example, the first sealant 160*a* may be provided in the form of a quadrangular frame. However, the present disclosure is not limited thereto.

Meanwhile, in an aspect of the present disclosure, an outer second sealant 160*b* may be disposed between the color filter substrate 105 and the array substrate 110 in a bezel area BA. The outer second sealant 160*b* may be disposed outside the first sealant 160*a* to measure the cell gap. For example, the second sealant 160*b* may include conductive balls.

For example, the second sealant 160*b* may be provided in the form of a quadrangular frame that surrounds (e.g., borders) the first sealant 160*a*. However, the present disclosure is not limited thereto.

In addition, the second liquid crystal layer 130*a* may be disposed between the first sealant 160*a* and the second sealant 160*b*. For example, the second liquid crystal layer 130*a* may be configured as a liquid crystal having a different type than the liquid crystal of the liquid crystal layer 130 in the display area AA. For example, the second liquid crystal layer 130*a* may be an IPS crystal and the liquid crystal layer 130 may be a vertical alignment (VA) crystal or a TN crystal. However, the present disclosure is not limited thereto.

In addition, a first electrode 140*a* and a third electrode 140*c* may be disposed above the array substrate 110 in the bezel area BA.

For example, the first electrode 140*a* may be electrically connected to a sensing line 170*a* through a first contact hole 145*a*. In addition, the third electrode 140*c* may be electrically connected to a common signal line 170*b* through a second contact hole 145*b*. For example, a gate drive circuit 175 may be disposed between the sensing line 170*a* and the common signal line 170*b*. However, the present disclosure is not limited thereto.

In addition, a second electrode 140*b* may be disposed above the color filter substrate 105 in the bezel area BA. For example, the second electrode 140*b* may be electrically connected to the third electrode 140*c* through the conductive balls in the second sealant 160*b*.

As described above, in the aspect of the present disclosure, the sealants including the first sealant 160*a* and the second sealant 160*b* are both formed in the bezel area BA of the display panel 100, and capacitance sensing structures configured by the first electrode 140*a* and the second electrode 140*b* are formed in the first sealant 160*a* and the second sealant 160*b*. For example, the cell gap in the bezel area BA may be measured and monitored based a capacitance between the first electrode 140*a* in the first sealant 160*a* and the second electrode 140*b* in the sealant 160*b*. In some examples, an external circuit (e.g., during manufacturing) or an internal circuit (e.g., the gate drive circuit 175) may be configured to detect stress applied to the display panel 100.

Specifically, a gate electrode 121 and a gate line may be disposed in the display area AA (e.g., the TFT area) of the array substrate 110, which is made of a transparent insulating material such as glass.

The gate electrode 121 may constitute a part of the gate line.

For example, the gate line may be disposed in a first direction.

In addition, the gate drive circuit 175, the sensing line 170*a*, and the common signal line 170*b* may be disposed in the non-display area NA, e.g., the bezel area BA of the array substrate 110.

The gate electrode 121, the gate line, the gate drive circuit 175, the sensing line 170*a*, and the common signal line 170*b* may each be formed by depositing a first metal layer on a front surface of the array substrate 110 and selectively patterning the first metal layer through a photolithography process.

In this case, the first metal layer may include at least any one selected from a group of conductive metals including aluminum (Al), aluminum alloy (Al alloy), tungsten (W), copper (Cu), copper alloy, molybdenum (Mo), silver (Ag), silver alloy (Ag alloy), gold (Au), gold alloy (Au alloy), chromium (Cr), titanium (Ti), titanium alloy, molybdenum-tungsten (MoW), molybdenum-titanium (MoTi), and copper/molybdenum-titanium (Cu/MoTi), a combination of two or more of these materials, or other appropriate materials.

The gate drive circuit 175 may be implemented in a gate-on-array (GOA) manner or a gate-in-panel (GIP) manner. However, the present disclosure is not limited thereto. In case that the gate drive circuit 175 is implemented in the GOA or GIP manner, for example, the gate drive circuit 175 may be integrated with the array substrate 110 and included in the array substrate 110, such that the gate drive circuit 175 may be a part of the array substrate 110.

A sensing signal for sensing the cell gap in the bezel area BA may be applied to the sensing line 170*a*. As shown in FIG. 7, the sensing line 170*a* may be disposed between the gate drive circuit 175 and the display area AA and oriented in the same direction as the data line. One end of the sensing line 170*a* may extend to the drive circuit 180, such that the sensing line 170*a* may be supplied with the sensing signal.

A common electrode signal may be applied to the common signal line 170*b*. However, the present disclosure is not limited thereto. For example, the common signal line 170*b* may be disposed outside the gate drive circuit 175 and oriented in the same direction as the data line. One end of the common signal line 170*b* may extend to the drive circuit 180, such that the common signal line 170*b* may be supplied with the common electrode signal.

A first insulation layer 115*a* may be disposed on the front surface of the array substrate 110 on which the gate electrode 121, the gate line, the gate drive circuit 175, the sensing line 170*a*, and the common signal line 170*b* are disposed.

The first insulation layer 115*a* may be a gate insulation layer within the active area AA and include a silicon (Si)-based oxide film, a nitride film, a compound including these films, a metal oxide film containing $Al_2O_3$, an organic insulation film, or a material with a dielectric constant (low-k) value.

As shown in FIG. 6, the first insulation layer 115*a* may extend into the non-display area NA.

Referring to FIG. 5, an active layer 124 may be disposed on the first insulation layer 115*a*.

The active layer 124 may be configured as a semiconductor layer.

The semiconductor layer may include amorphous silicon (a-Si), low-temperature polycrystalline silicon (LTPS), IGZO-based oxide semiconductors, compound semiconductors, carbon nanotubes, graphene and organic semiconductors, or the like.

The oxide semiconductor may be made of a material, which is made by adding silicon (Si) to an oxide semiconductor including zinc (Zn), and one or more materials selected from a group consisting of germanium (Ge), tin (Sn), lead (Pb), indium (In), titanium (Ti), gallium (Ga), and aluminum (Al). For example, the semiconductor layer may be made of silicon indium zinc oxide (Si—InZnO: SIZO) made by adding silicon ions to indium zinc composite oxide (InZnO).

In case that the semiconductor layer is made of SIZO, a composition ratio of the silicon (Si) atom content to the total content of zinc (Zn), indium (In), and silicon (Si) atoms in the active layer 124 may be about 0.001 weight % (wt. %) to about 30 wt. %. As the silicon (Si) atom content increases, the function of controlling electron generation may be improved, the mobility may be decreased, and the stability of the elements may be improved. However, the present disclosure is not limited thereto.

For example, in case that the active layer 124 is made of an amorphous silicon thin-film, an n+ amorphous silicon thin-film pattern 125*n*, which is patterned in substantially the same shape as the active layer 124, may be disposed on the active layer 124. However, the present disclosure is not limited thereto.

A source electrode 122 and a drain electrode 123 may be disposed on the active layer 124.

The data line 117 may be disposed on the same layer as the source electrode 122 and the drain electrode 123.

The data line 117, the source electrode 122, and the drain electrode 123 may constitute a second metal layer.

The second metal layer may include at least any one selected from a group of conductive metals including aluminum (Al), aluminum alloy (Al alloy), tungsten (W), copper (Cu), copper alloy, molybdenum (Mo), silver (Ag), silver alloy (Ag alloy), gold (Au), gold alloy (Au alloy), chromium (Cr), titanium (Ti), titanium alloy (Ti alloy), molybdenum-tungsten (MoW), molybdenum-titanium (MoTi), and copper/molybdenum-titanium (Cu/MoTi), a combination of two or more of these materials, or other appropriate materials.

As described above, the data lines 117 may be disposed in the second direction that is different from the first direction and separates the plurality of sub-pixels P together with the gate lines.

The gate electrode 121 connected to the gate line, the active layer 124 disposed above the gate electrode 121, the source electrode 122 connected to the data line 117, and the drain electrode 123 disposed to be opposite to the source electrode 122 may constitute the thin-film transistor.

A second insulation layer 115*b* may be disposed on the same layer on the data line 117, the source electrode 122, and the drain electrode 123.

For example, the second insulation layer 115*b* may be an interlayer insulation layer and include a silicon (Si)-based oxide film, a nitride film, a compound including these films, a metal oxide film containing $Al_2O_3$, an organic insulation film, or a material with a dielectric constant (low-k) value.

As shown in FIG. 6, the second insulation layer 115*b* may extend to the non-display area NA.

A third insulation layer 115*c* may be disposed on the second insulation layer 115*b*.

For example, the third insulation layer 115*c* may be a planarization layer and include a silicon (Si)-based oxide film, a nitride film, a compound including these films, a metal oxide film containing $Al_2O_3$, an organic insulation film, or a material with a dielectric constant (low-k) value.

The third insulation layer 115*c* may also extend into the non-display area NA.

The pixel electrode 118 may be disposed on the third insulation layer 115*c*.

For example, the pixel electrode 118 may be formed in a rectangular shape on the sub-pixel P.

The pixel electrode 118 may be made of a transparent conductive material, such as indium-tin-oxide (ITO) or indium-zinc-oxide (IZO), that has a high transmittance rate. However, the present disclosure is not limited thereto.

A fourth insulation layer 115*d* may be disposed on the pixel electrode 118.

For example, the fourth insulation layer 115*d* may include a silicon (Si)-based oxide film, a nitride film, a compound including these films, a metal oxide film containing $Al_2O_3$, an organic insulation film, or a material with a dielectric constant (low-k) value.

The fourth insulation layer 115*d* may also extend into the non-display area NA.

In some cases, predetermined areas of the first insulation layer 115*a*, the second insulation layer 115*b*, the third insulation layer 115*c* are selectively removed to form a drain contact hole and expose a part of the drain electrode 123. In addition, for example, predetermined areas of the first insulation layer 115*a*, the second insulation layer 115*b*, the third insulation layer 115*c*, and the fourth insulation layer 115*d* are selectively removed, such that the first contact hole 145*a*, through which a part of the sensing line 170*a* is exposed, may be formed, and the second contact hole 145*b*, through which a part of the common signal line 170*b* is exposed, may be formed.

For example, the first contact hole 145*a* may be formed for each sensor block SB, and a plurality of second contact hole 145*b* may be provided for each block SB. However, the present disclosure is not limited thereto.

In addition, the common electrode 108 may include a plurality of slits 108*s* and may be disposed on the fourth insulation layer 115*d*.

The plurality of common electrodes 108 may be disposed in a finger or herringbone shape in the sub-pixel P. However, the present disclosure is not limited thereto. The common electrodes 108 may be disposed in a straight shape in the vertical or horizontal direction.

In addition, the first electrode 140*a* and the third electrode 140*c* may be disposed on the fourth insulation layer 115*d* in the non-display area NA.

The first electrode 140a may be electrically connected to the sensing line 170a through the first contact hole 145a. Further, the third electrode 140c may be electrically connected to the common signal line 170b through the second contact hole 145b.

The first electrode 140a and the third electrode 140c may be separated from each other.

The first electrode 140a may have a shape corresponding to the sensor block SB. For example, the first electrode 140a may have a quadrangular shape corresponding to the sensor block SB, and a part of the first electrode 140a may extend toward the sensing line 170a.

The third electrode 140c may be disposed outside the first electrode 140a. For example, the third electrode 140c may be disposed above the common signal line 170b along the common signal line 170b and overlap the common signal line 170b. However, the present disclosure is not limited thereto.

The array substrate 110, which is configured as described above, may be attached to the color filter substrate 105 disposed above the array substrate 110, thereby constituting the display panel 100. The liquid crystal layer 130 is interposed between the array substrate 110 and the color filter substrate 105. Further, the first spacer 150 may be disposed between the color filter substrate 105 and the array substrate 110 to maintain the cell gap between the color filter substrate 105 and the array substrate 110. In this case, for example, the first spacer 150 may be configured as a column spacer.

For example, the array substrate 110, which is configured as described above, is attached to the color filter substrate 105 to be opposite to the color filter substrate 105 based on the first sealant 160a formed at the outer periphery of the display area AA.

In this case, the color filter substrate 105 includes the thin-film transistors, the black matrix 106 to suppress a leak of light to the gate lines and the data lines 117, and the color filter including the red, green, and blue sub-color filters 107.

Meanwhile, in the aspect of the present disclosure, the second sealant 160b may be disposed in the bezel area BA disposed outside the first sealant 160a. For example, the second sealant 160b may be disposed in the bezel area BA disposed between the color filter substrate 105 and the array substrate 110.

For example, the second sealant 160b may include the conductive balls.

In addition, the second liquid crystal layer 130a may be disposed between the first sealant 160a and the second sealant 160b. For example, the second liquid crystal layer 130a may be configured have a different type than the liquid crystal of the liquid crystal layer 130 in the display area AA. However, the present disclosure is not limited thereto.

For example, the second liquid crystal layer 130a may include a liquid crystal with a permittivity of 0 or a low permittivity to not affect electric fields between the first electrode 140a and the third electrode 140c of the array substrate 110 and the second electrode 140b of the color filter substrate 105.

The second electrode 140b may be disposed above the color filter substrate 105 in the bezel area BA. For example, the second electrode 140b may be electrically connected to the third electrode 140c through the conductive balls in the second sealant 160b. Therefore, the second electrode 140b may receive the common electrode signal supplied to the common signal line 170b.

In one example, the second electrode 140b may have a box shape including (or covering) all the plurality of sensor blocks SB. However, the present disclosure is not limited thereto.

A second spacer 150a may be disposed between the first electrode 140a and the second electrode 140b. The second spacer 150a may maintain the cell gap between the color filter substrate 105 and the array substrate 110 in the bezel area BA. For example, the second spacer 150a may be configured as a column spacer.

The second spacer 150a in the non-active area NA may have a different height from the first spacer 150 in the active area AA. The second spacer 150a and the first spacer 150 may be made of the same material or different materials.

In this case, the capacitance sensing structure may be formed between the first electrode 140a, to which the sensing signal is applied, and the second electrode 140b to which the common electrode signal is applied. Therefore, the cell gap in the bezel area BA may be measured and monitored. As a result, it is possible to monitor, in real time, the change in capacitance (Cap) during the module process and immediately cope with detected defects. In addition, it is possible to improve reliability by suppressing an image defect, such as a yellow mura or a bright spot, caused by an external force. For example, the change in capacitance (Cap) may be recognized when the cell gap fluctuates because of stress, such that the stress applied to the display panel 100 may be monitored. For reference, in the related art, the bezel area cannot transmit light because of the black matrix, and the cell gap cannot be measured. In contrast, in the aspect of the present disclosure, the capacitance sensing structure is formed in the bezel area BA, which may monitor the change in capacitance (Cap) in real time. In particular, the aspect of the present disclosure is advantageous in performing quantitative stress analysis on the plurality of sensor blocks SB.

As described above, the present disclosure may actively cope with the non-uniformity of the cell gap in the bezel area BA caused by the increase in narrow bezel models.

The exemplary embodiments of the present disclosure may also be described as follows:

According to an aspect of the present disclosure, a display device is disclosed. The display device includes a first substrate including a display area and a non-display area; a first liquid crystal layer disposed on the display area and the non-display area of the first substrate; a first sealant bordering the first liquid crystal layer; a second liquid crystal layer bordering the first sealant; a second sealant bordering the second liquid crystal layer; and a capacitor formed based on a first electrode and a second electrode at opposite ends of the second liquid crystal layer for detecting stress applied to the display panel.

Another aspect of the present disclosure includes a method for manufacturing a display device. The method includes forming a device layer including a plurality of TFTs; forming an insulation layer over the device layer; forming first holes in the insulation layer along a periphery of an active area of the display panel; forming second holes in the insulation layer that are outside of the first holes; forming a first conductive layer over the first holes and the second holes; forming a first sealant over the first holes; forming a first liquid crystal layer within the active area and the non-active area within the first holes; forming a second sealant over the second holes; forming a second liquid crystal layer between the second sealant and the first sealant; and forming a second conductive layer over the first sealant and the second sealant, wherein the first conductive layer and the second conductive layer form a capacitor.

According to an aspect of the present disclosure, a display device is disclosed. The display device includes a first substrate including a display area and a non-display area; a second substrate attached to the first substrate including a first sealant; a first liquid crystal layer disposed inside a region formed by the first sealant; a second sealant disposed outside a region formed by the first sealant; a second liquid crystal layer disposed between the first sealant and the second sealant; a first electrode disposed on the first substrate in the non-display area; and a second electrode disposed on the second substrate in the non-display area and forming a capacitance with the first electrode.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A display panel, comprising:

a first substrate including a display area and a non-display area;

a first liquid crystal layer disposed on the display area and the non-display area of the first substrate;

a first sealant bordering the first liquid crystal layer;

a second liquid crystal layer bordering the first sealant;

a second sealant bordering the second liquid crystal layer; and a capacitor formed based on a first electrode and a second electrode at opposite ends of the second liquid crystal layer for detecting stress applied to the display panel, wherein the first sealant is disposed on the first electrode in contact with the first electrode.

2. The display panel of claim 1, further comprising at least one spacer in the second liquid crystal layer to maintain a distance between the first electrode and the second electrode.

3. The display panel of claim 2, wherein the at least one spacer comprises:

one or more first spacers disposed between the first substrate and a second substrate in the display area and configured to maintain a first cell gap; and one or more second spacers disposed between the first substrate and the second substrate in the non-display area and configured to maintain a second cell gap.

4. The display panel of claim 1, wherein the second sealant is conductive and electrically connects a common signal line on the first substrate to the capacitor.

5. The display panel of claim 1, wherein the capacitor is disposed on a gate drive circuit integral to the display panel.

6. The display panel of claim 1, wherein a gate drive circuit is configured to detect stress applied to the display panel based on a change in a capacitance to the capacitor.

7. The display panel of claim 1, further comprising a second substrate disposed on the first liquid crystal layer, the first sealant, the second liquid crystal layer, and the second sealant.

8. The display panel of claim 1, further comprising:

a sensing line disposed below the first sealant; and a contact hole formed by selectively removing a portion of the insulating layer to expose a portion of the sensing line.

9. The display panel of claim 1, wherein the capacitor is configured to monitor a cell gap between the first substrate to a second substrate.

10. The display panel of claim 8, wherein the first electrode is electrically connected to the sensing line through the contact hole, and wherein the first sealant is disposed on the first electrode including the contact hole.

11. A method of manufacturing a display panel, comprising:

forming a device layer including a plurality of thin film transistors (TFTs) on a first substrate;

forming an insulation layer over the device layer;

forming first holes in the insulation layer in a non-active area along a periphery of an active area of the display panel;

forming second holes in the insulation layer that are outside of the first holes;

forming a first conductive layer over the first holes and the second holes;

forming a first sealant over the first holes;

forming a first liquid crystal layer within the active area and the non-active area within the first holes;

forming a second sealant over the second holes; and forming a second liquid crystal layer between the second sealant and the first sealant; and forming a second conductive layer over the first sealant and the second sealant, wherein the first conductive layer and the second conductive layer form a capacitor.

12. A display device comprising:

a first substrate including a display area and a non-display area;

a second substrate attached to the first substrate including a first sealant;

a first liquid crystal layer disposed inside a region formed by the first sealant;

a second sealant disposed outside a region formed by the first sealant;

a second liquid crystal layer disposed between the first sealant and the second sealant;

a first electrode disposed on the first substrate in the non-display area; and a second electrode disposed on the second substrate in the non-display area and forming a capacitance with the first electrode, wherein the first sealant is disposed on the first electrode in contact with the first electrode, and wherein the second sealant is disposed on the second electrode in contact with the second electrode.

13. The display device of claim 12, wherein the second liquid crystal layer and the first liquid crystal layer comprise different materials.

14. The display device of claim 12, further comprising:

a first spacer disposed between the first substrate and the second substrate in the display area and configured to maintain a first cell gap; and a second spacer disposed between the first substrate and the second substrate in the non-display area and configured to maintain a second cell gap.

15. The display device of claim 14, wherein the first cell gap and the second cell gap are different from each other, and wherein the first spacer and the second spacer have different heights.

16. The display device of claim 14, wherein the second spacer is disposed between the first electrode and the second electrode.

17. The display device of claim 12, further comprising:

a third electrode disposed below the second sealant and outside of the first electrode.

18. The display device of claim 17, further comprising:

a sensing line disposed below the first sealant, wherein one end of the sensing line is connected to a drive circuit and supplied with a sensing signal.

19. The display device of claim 18, further comprising:

a common signal line disposed below the second sealant, wherein one end of the common signal line is connected to the drive circuit and supplied with a common electrode signal.

20. The display device of claim 19, wherein the first electrode is connected to the sensing line through a first contact hole.

21. The display device of claim 20, wherein the first electrode has a shape corresponding to sensor blocks, and a part of the first electrode extends toward the sensing line.

22. The display device of claim 21, wherein the third electrode is connected to the common signal line through a second contact hole, and wherein each sensor block includes a plurality of second contact holes.

23. The display device of claim 17, wherein the second sealant includes a conductive ball, and wherein the second electrode is connected to the third electrode through the conductive ball.

24. The display device of claim 21, wherein the second electrode covers each sensor block.

25. The display device of claim 19, wherein the third electrode is disposed on the common signal line along the common signal line and overlaps the common signal line.

26. The display device of claim 12, further comprising:

a black matrix disposed on the second substrate, wherein the second electrode is disposed on the black matrix.

* * * * *